United States Patent
Adkins et al.

(10) Patent No.: US 8,495,112 B2
(45) Date of Patent: Jul. 23, 2013

(54) DISTRIBUTED FILE HIERARCHY MANAGEMENT IN A CLUSTERED REDIRECT-ON-WRITE FILE SYSTEM

(75) Inventors: Janet E. Adkins, Austin, TX (US); Joon Chang, Austin, TX (US); David J. Craft, Wimberly, TX (US); Gokul B. Kandiraju, Tarrytown, NY (US); Manoj N. Kumar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/879,717

(22) Filed: Sep. 10, 2010

(65) Prior Publication Data

US 2012/0066278 A1 Mar. 15, 2012

(51) Int. Cl.
*G06F 17/30* (2006.01)

(52) U.S. Cl.
USPC .......... 707/829; 707/693; 707/649; 714/42

(58) Field of Classification Search
USPC .............. 707/829, 693, 649; 714/42
See application file for complete search history.

(56) References Cited

U.S. PATENT DOCUMENTS

| | | | |
|---|---|---|---|
| 6,385,625 B1 | 5/2002 | Slaughter | |
| 7,475,077 B2* | 1/2009 | Burnett et al. | 1/1 |
| 7,617,216 B2 | 11/2009 | Fridella et al. | |
| 8,010,493 B2* | 8/2011 | Anderson et al. | 707/638 |
| 8,200,632 B2* | 6/2012 | Schack et al. | 707/639 |
| 8,255,364 B2* | 8/2012 | Burnett et al. | 707/640 |
| 2005/0234867 A1 | 10/2005 | Shinkai | |
| 2007/0179991 A1* | 8/2007 | Burnett et al. | 707/201 |
| 2008/0046538 A1* | 2/2008 | Susarla et al. | 709/217 |
| 2008/0071984 A1* | 3/2008 | Araki et al. | 711/114 |
| 2009/0006486 A1* | 1/2009 | Burnett et al. | 707/200 |

OTHER PUBLICATIONS

Using a Cluster File System—TH-CluFS—To Construct a Scalable Cluster System of Web Servers, Liu Wei et al., 2001.*
Braam, Peter J. et al., "The Lustre Storage Architecture", *Cluster File Systems, Inc.* http://www.clusterfs.com Aug. 31, 2004, 439 pages.

* cited by examiner

*Primary Examiner* — Jean M Corrielus
(74) *Attorney, Agent, or Firm* — DeLizio Gilliam, PLLC (57) ABSTRACT

Management of a file hierarchy for a clustered file system can be distributed across nodes of the cluster. A cluster file hierarchy is accessed to determine location of a file in response to a request to write to a file. A first node maintains the cluster file hierarchy. It is determined that management of a fileset object, which represents a fileset that includes the file, has been delegated to a second node based, at least in part, on said accessing the cluster file hierarchy. A node file hierarchy maintained by the second node is accessed responsive to determining the delegation. The cluster file hierarchy represents filesets of the clustered file system and the node hierarchy represents a subset of one or more of the filesets. Location of the file is determined based, at least in part, on said accessing the node file hierarchy.

15 Claims, 7 Drawing Sheets

DISTRIBUTED FILE HIERARCHY MANAGEMENT IN A CLUSTERED REDIRECT-ON-WRITE FILE SYSTEM

BACKGROUND

Embodiments of the inventive subject matter generally relate to the field of computerized file systems, and, more particularly, to distributed management of objects in a clustered redirect-on-write file system.

A snapshot is a common industry term either denoting the ability to record the state of a system at a given point in time, or referring to the actual copy of the state of the system. A snapshot can be used to restore a system or storage device in the event that it fails. Typically, a snapshot is done instantly and made available for use by other applications such as data protection, data analysis and reporting, and data replication applications. File systems or volume managers use snapshot technology to maintain a consistent view of data. Snapshot technology can be implemented with a copy-on-write approach, or a redirect-on-write approach.

With the copy-on-write approach, a snapshot of a storage volume is created using a pre-designated space for the snapshot. When the snapshot is first created, only the meta-data about where original data is stored is copied. The data itself is not copied at the time the snapshot is created. Therefore, the creation of the snapshot is almost instantaneous. The snapshot technology then tracks the changing blocks on the original volume as writes to the original volume are performed. The original data that is being written to is copied into the designated storage pool that is set aside for the snapshot before original data is overwritten. Before a write is allowed to a block, copy-on-write moves the original data block to the snapshot storage. Read requests to the snapshot volume of the unchanged data blocks are redirected to the original volume, while read requests to data blocks that have been changed are directed to the "copied" blocks in the snapshot. Snapshot contains the meta-data that describes the data blocks that have changed since the snapshot was first created.

With the redirect-on-write approach, new writes to an original volume are redirected to another location set aside for a snapshot. Thus, one write takes place with redirect-on-write, whereas two writes occur (one to copy original data onto the storage space, the other to copy changed data) with copy-on-write.

SUMMARY

Embodiments of the inventive subject matter include a method for distributed management of a file hierarchy of a clustered file system. A cluster file hierarchy is accessed to determine location of a file in response to a request to write to a file. A first node maintains the cluster file hierarchy. It is determined that management of a fileset object, which represents a fileset that includes the file, has been delegated to a second node based, at least in part, on said accessing the cluster file hierarchy. A node file hierarchy maintained by the second node is accessed responsive to determining the delegation. The cluster file hierarchy represents filesets of the clustered file system and the node hierarchy represents a subset of one or more of the filesets. Location of the file is determined based, at least in part, on said accessing the node file hierarchy.

Embodiments of the inventive subject matter also include computer program product for distributed management of a file hierarchy of a clustered file system. The computer program product comprises a computer readable storage medium having computer usable program code embodied therewith. The computer usable program code is configured to manage a cluster file hierarchy for a clustered file system. The cluster file hierarchy comprises a computer readable representation of a logical grouping of filesets, computer readable representations of filesets, and computer readable representations of files. The computer usable program code is configured to determine a condition for delegating management of a fileset of the clustered file system to a different node. The computer usable program code is configured to communicate to the different node the fileset and that the different node will manage the fileset. The computer usable program code is configured to mark a first of the computer readable representations of filesets to reflect management of the fileset by the different node.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to inodes and numbered files, other file allocation tracking techniques can be used consistent with the inventive subject matter. In addition, examples are described with reference to pointers. Pointers can be implemented as absolute pointers (e.g., address or vector of addresses) or relative pointers (e.g., offset). In other instances, well-known instruction instances, protocols, structures and techniques have not been shown in detail in order not to obfuscate the description.

A file system maintains a file hierarchy that represents a logical organization of file sets and files. A file is a container for data. The data of a file can be in a contiguous region of a machine-readable storage medium (e.g., disk) or in several non-contiguous regions or data blocks. A fileset or directory is a logical grouping of files. A meta fileset is a logical grouping of filesets. Creation or modification to a file or fileset impacts the file hierarchy. In a redirect-on-write file system, changes to a file propagate up the file hierarchy since the new location is reflected in multiple levels of the file hierarchy.

In a clustered file system, one of the nodes in the cluster, which will be referred to herein as the cluster file hierarchy manager node, maintains a file system hierarchy for files and filesets across the cluster. Changes to files or filesets that occur throughout the cluster are communicated to the cluster file hierarchy manager node so that the file hierarchy manager node can update the cluster file hierarchy. The communication exchange between the cluster file hierarchy manager node and the other nodes of the cluster adds inefficiency. In addition, the nodes in the cluster probably operate at their own snapshot intervals, increasing complexity of coordinated synchronization. Moreover, the coordinated synchronization among the nodes produces a consistency snapshot at the rate of the slowest performing node in the cluster to the point of errant nodes hindering the production of a consistency snapshot.

Distributing portions of the file hierarchy throughout the cluster obviates some of the coordinated synchronization challenges. A cluster file hierarchy manager node can delegate management of portions of the file hierarchy to other nodes within the cluster ("node file hierarchy manager nodes"), while the cluster file hierarchy manager node maintains at least a comprehensive high level view of the cluster file system hierarchy. Distributed file hierarchy management reduces communication overhead and reduces the effects of an errant or slow performing node.

Prior to distributed file system hierarchy management, the file system hierarchy comprised three levels: 1) a meta fileset level; 2) a fileset level; and 3) a file level. Distribution of file system hierarchy maintenance to nodes within a cluster adds an additional level to the file system hierarchy, which will be referred to herein as "node meta fileset level." Consequently, the meta fileset level will be referred to as the "cluster meta fileset level" when presented in the context of the four level file hierarchy. Moreover, the file hierarchy maintained by the cluster file hierarchy manager node will be referred to herein as a cluster file hierarchy, while the portions of the file hierarchy maintained by the node file hierarchy manager nodes will be referred to herein as node file hierarchies. Each level of a file hierarchy can comprise one or more elements (e.g., the fileset level of a file hierarchy can comprise multiple filesets). This description will refer to the machine readable medium encoded representation of elements of a file hierarchy as objects. Thus, the machine encoding of file hierarchy elements will be referred to with the terms meta fileset object, cluster meta fileset object, node meta fileset object, fileset object, and file object. An object can be implemented as any one of a variety of encodings that can include various data structures and/or files of various formats. In some implementations, the objects may be inodes. Regardless of the particular term or implementation, an object identifies itself, identifies a referenced object, and indicates location of a referenced object. An object may also reference a parent object in some implementations if relevant. Although objects are written to a non-volatile storage or memory, the objects also can reside in volatile memory of a node.

Figure 1:
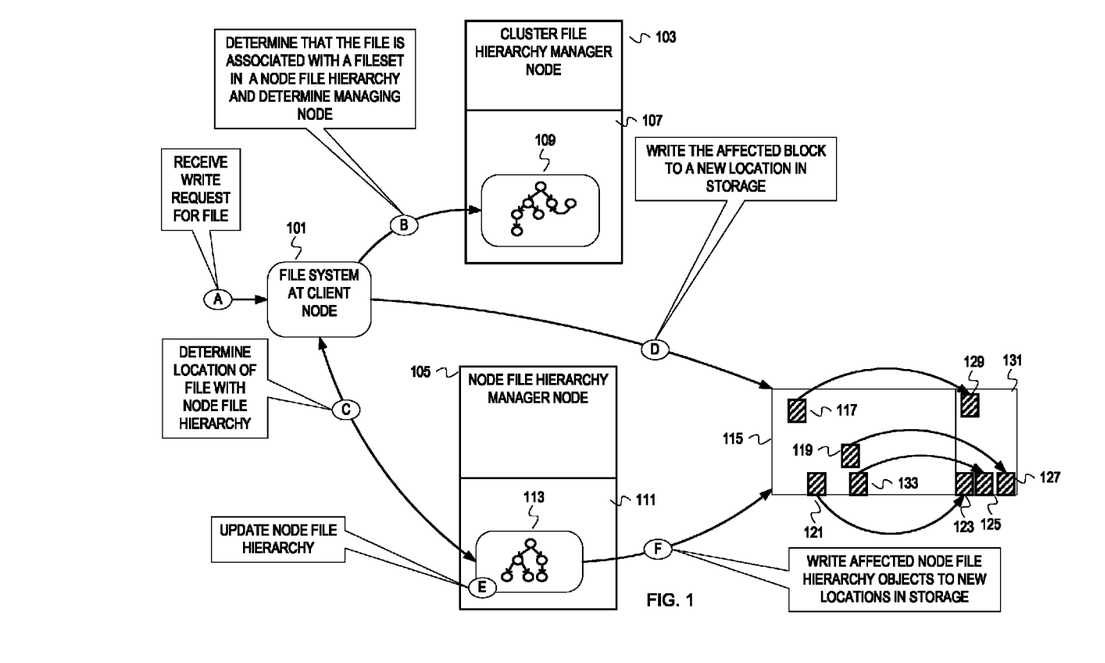
FIG. 1 depicts an example conceptual diagram of a write request being handled within a clustered file system with distributed management of the file hierarchy.
Figure 2:
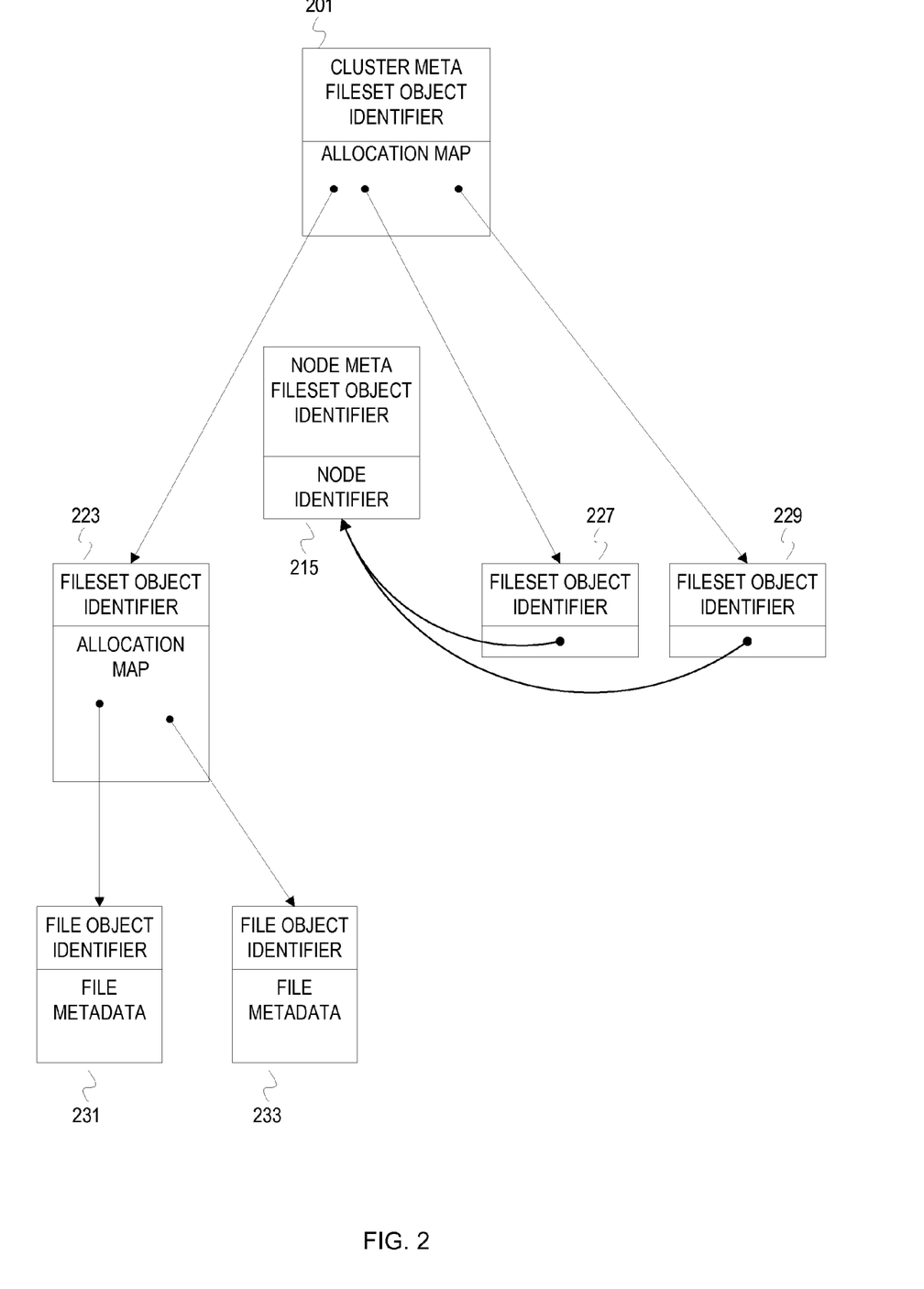
FIG. 2 depicts an example logical cluster file hierarchy.
Figure 3:
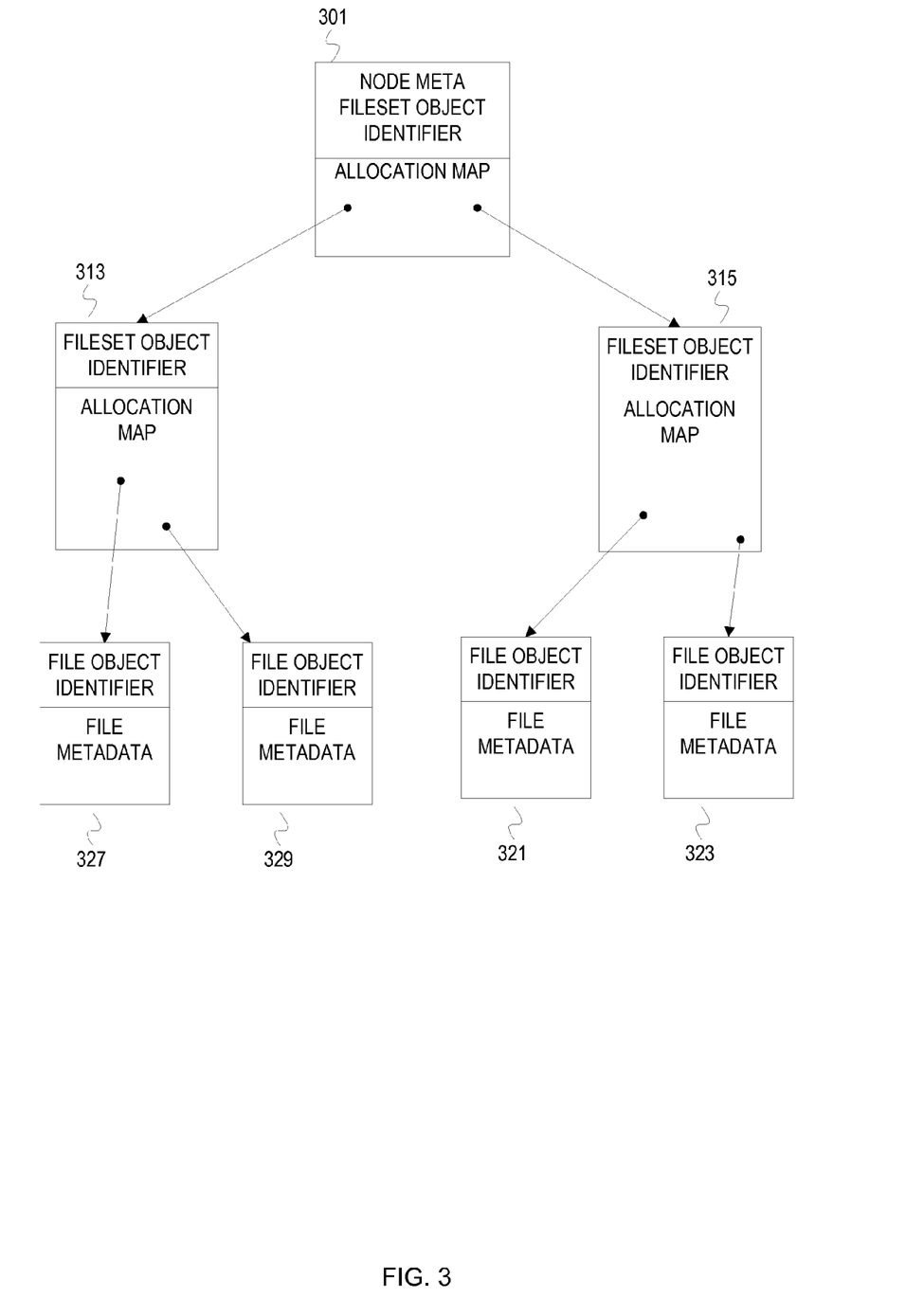
FIG. 3 depicts an example logical node file hierarchy.

FIG. 1 depicts an example conceptual diagram of a write request being handled within a clustered file system with distributed management of the file hierarchy. FIG. 1 depicts a cluster that at least comprises a cluster file hierarchy manager node 103, a machine-readable storage medium 115, and a node file hierarchy manager node 105. An instance of a file system 101 at a client node communicates with a file system instance 109 running on the cluster file hierarchy manager node 103 and a file system instance 113 running on the node file hierarchy manager node 105. The file system instance 109 maintains/manages a cluster file hierarchy. The file system instance 113 maintains/manages a node file hierarchy. FIGS. 2 and 3 respectively depict an example cluster file hierarchy and an example node file hierarchy.

FIG. 2 depicts an example logical cluster file hierarchy. The cluster file hierarchy comprises a cluster meta fileset object 201, fileset objects 223, 227, 229, and a node meta fileset object 215.

The cluster meta fileset object 201 comprises a cluster meta fileset object identifier (e.g., a file number) and an allocation map. The allocation map can be implemented as an array of pointers, a table of pointers, etc. Regardless of the particular implementation, the information of the cluster meta fileset object 201 can be dereferenced or resolved to other objects. The allocation map can also indicate metadata for the referenced fileset objects. The allocation map of the meta fileset object 201 points to the fileset objects 223, 227, 229.

The fileset object 223 is managed by a cluster hierarchy node manager. So, the fileset object 223 comprises a fileset object identifier and an allocation map. The allocation map of the fileset object 223 points to file objects 231, 233. The file objects 231, 233 comprise file object identifiers and file metadata for files represented by the file objects 231, 233. The file metadata can include file name, file size, permissions, etc. The file metadata also includes pointers to data blocks of a file. A file object can reference data blocks, indirect block pointers, doubly indirect block pointers, etc.

The fileset objects 227, 229 do not reference file objects. Instead, the fileset objects 227, 229 reference the node meta fileset object 215. The fileset objects 227, 229 point to the node meta fileset object 215 because the represented filesets are managed by a node other than the cluster file hierarchy manager node. Although the fileset objects 227, 229 are seemingly depicted as having a single field, the fileset objects 227, 229 can be implemented with the same structure as the fileset object 223. In this example, the allocation maps for the fileset objects 227, 229 have been set to only reference the node meta fileset object 215. Embodiments can replace fileset objects with a different fileset object when management of the represented fileset is bequeathed to a different node.

The node meta fileset object 215 comprises a node meta-fileset object identifier and a node identifier. The node meta-fileset object identifier indicates an identifier of the node meta-fileset object 215. The node identifier identifies the node (e.g., network address) that manages the filesets represented by the fileset object identifiers 227, 229.

FIG. 3 depicts an example logical node file hierarchy. The node file hierarchy comprises a node meta-fileset object 301, fileset objects 313, 315, and for file objects 327, 329, 321, 323.

The node meta-fileset object 301 comprises a node meta-fileset object identifier and an allocation map. The node meta-fileset object identifier identifies the node meta-fileset object 301. The allocation map points to the fileset objects 313, 315.

The fileset objects 313, 315 comprise fileset object identifiers and allocation maps. The allocation map of the fileset object 313 points to the file objects 327, 329. The allocation map of the fileset object 315 points to the file objects 321, 323. The structure of the file objects of FIG. 3 are similar to the file objects of FIG. 2. Although the file hierarchies depicted in FIGS. 2 and 3 are illustrated as trees, embodiments can implement file hierarchies in accordance with various techniques. For instance, a file hierarchy may logically be flat as the objects are implemented as a set of files. In addition, the computer readable representations of file hierarchies may be data structures in volatile memory of relevant nodes that are later written as files or into file in persistent memory or storage.

Returning to FIG. 1, a plurality of stages are depicted to illustrate example operations for handling a write request in a clustered file system with distributed management of filesets.

The file system 101 receives a write request targeting a file in the file system at a stage A. For example, a command is entered that modifies the file.

At a stage B, the file system 101 determines that the file is associated with a fileset in a node file hierarchy. The file system 101 then determines the node managing the file set associated with the file. Stage B involves the file system 101 requesting location of the file from the file system instance 109 running on the cluster file hierarchy manager node 103. The file system instance 109 uses the cluster file hierarchy to determine that the file is in a fileset managed by different node. And the file system instance 109 determines identity of that node. The file system instance 109 then returns the identity of the managing node, which is the node file hierarchy manager node 105, to the file system 101.

At a stage C, the file system 101 communicates with the file system instance 113 running on the node file hierarchy manager node 105 to determine location of the file. Stage C involves the file system 101 querying the file system instance 113 for location of the file. The file system instance 113 uses the node file hierarchy to determine location of the file. For example, the file system instance 113 dereferences a series of pointers of objects at different levels of the node file hierarchy to data blocks affected by the write. The file system instance 113 then replies to the file system 101 with an indication of the file location.

At a stage D, the file system 101 performs the write to the file. With the information from the node file hierarchy manager node 105, the file system 101 determines that a storage device 115 hosts a data block 117 that backs a region of the file affected by the write. The file system 101 writes the affected block to a new location 129 and a region 131 of the storage device 115. In this example, the region 131 is preallocated for redirect on write. Embodiments may implement striping or redundancy mechanisms. In addition, embodiments may preallocate redirect on write regions on different storage devices. This description does not go into the details of various storage techniques to avoid obfuscating the inventive subject matter.

At a stage E, the file system instance 113 running on the node file hierarchy manager node 105 updates the node file hierarchy to reflect the new location 129. In some embodiments, the file system 101 informs the file system instance 113 of the new location 129. In some embodiments, the node file hierarchy manager node 105 allocates the new location 129 for the file. Therefore, the node file hierarchy manager node 105 already knows the location 129. In some embodiments, the node 105 is where the new location 129 because the node 105 performed the write. The file system instance 113 starts to update the node file hierarchy by updating the file object corresponding to the file to indicate the new location 129. In this example, the change to the file object affects objects at higher levels of the node file hierarchy managed by the node file hierarchy manager node 105. Since the file object is modified to reflect the new location 129, the file object is also written to a new location. Consequently, the fileset object that points to the file object will also have to be updated to reference the new location of the file object. The update to the fileset object will cause the fileset object be written to a new location, which then will cause the referencing node meta-fileset object to be updated.

At stage F, the node file hierarchy manager node 105 performs the writes for the affected node file hierarchy objects. As depicted in FIG. 1, a data block 121 corresponding to the file object representing the file is written to a new location 123 of the region 131. A data block 119 corresponding to the fileset object is written to a new location 127 of the region 131. A data block 133 corresponding to the node meta-fileset object is written to a new location 125 of the region 131. It is not necessary for the data blocks to be written to a same region of a same storage device. The data blocks may be spread across multiple storage devices and/or multiple preallocated regions. Regardless of the particular locations of the data blocks, the new location of the file, or at least a block of the file, is reflected in the node file hierarchy without being forced to go through the cluster file hierarchy manager node 103. In addition, the cluster file hierarchy manager node 103 is not hampered by performance or differences in snapshot timing of the node file hierarchy manager node 105.

Although the example above describes the file system of a client performing redirect on write, embodiments may use an intermediary node to perform the redirect on write for the client. Embodiments can also implement redirect on write for the client with the node that is managing the fileset associated with the target file (i.e., the managing node performs the write to the data block for the client).

The example operations depicted in FIG. 1 illustrate operations for handling a write request after management of a file set has already been delegated or bequeathed to another node. Prior to bequeathal, a global or central node (i.e., the cluster file hierarchy manager node) initially manages fileset. After a trigger or condition is satisfied, the cluster file hierarchy manager node bequeaths fileset management to another node. This bequeathal is reflected in the cluster file hierarchy.

Figure 4:
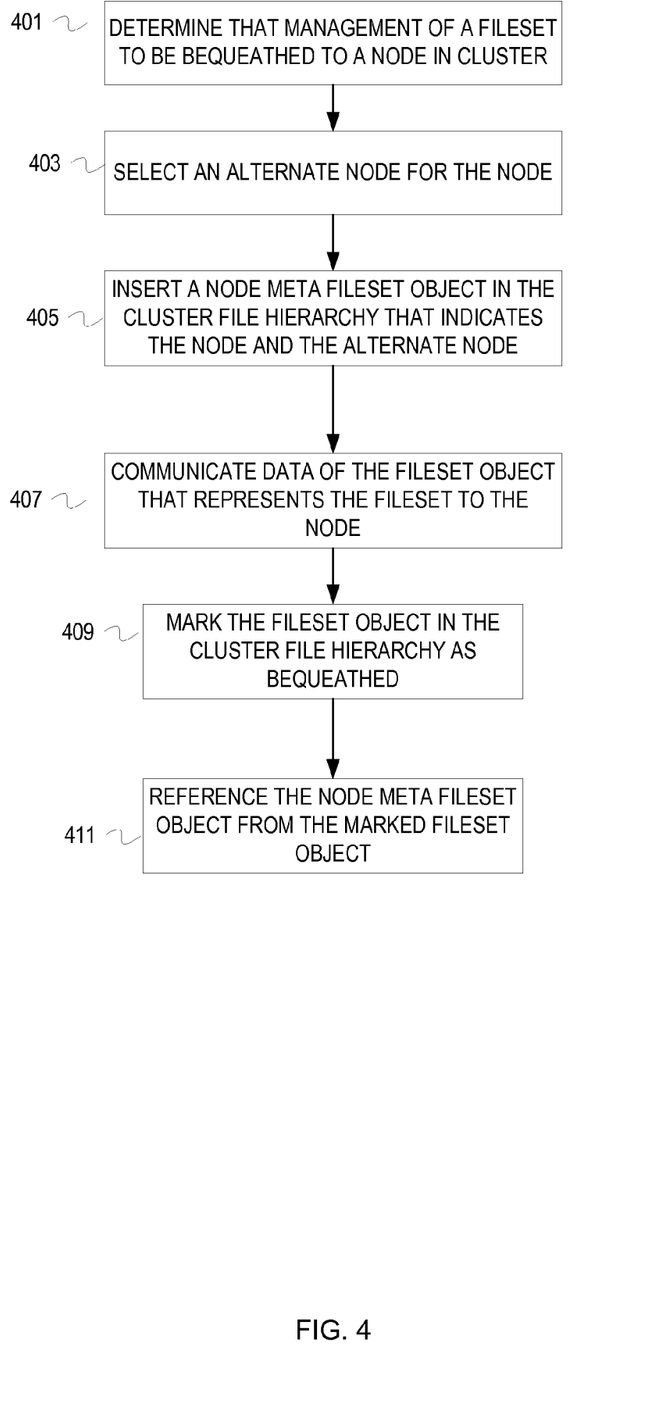
FIG. 4 depicts a flowchart of example operations for delegating fileset management to another node in a cluster.

FIG. 4 depicts a flowchart of example operations for delegating fileset management to another node in a cluster. Initially a determination is made that management of a fileset is to be bequeathed to a node in a cluster (401). For example, it is determined that the node frequently accesses the fileset.

An alternate node, or backup node, is then selected for the node that will manage the fileset (403). The alternate node is selected for failover purposes. It is not necessary for embodiments to select an alternate node.

A node meta-fileset object is inserted into a cluster file hierarchy (405). The node meta-fileset object indicates both the node that will manage the fileset and the selected alternate node. Of course, embodiments that do not select an alternate node will not indicate an alternate node in the node meta-fileset object. Embodiments do not necessarily wait until a determination that management is being bequeathed to insert a node meta-fileset object into the cluster file hierarchy. Embodiments can add a node meta-fileset object to the cluster file hierarchy as nodes are added to the cluster. When fileset management bequeathal is determined, the cluster file hierarchy including the node meta-fileset object can be updated accordingly.

The data of the fileset object that represents the fileset to be managed by the node is communicated to the node (407). For example, an image of the fileset object is transmitted to the node. After creating a node file hierarchy that includes a fileset object with the communicated data, to managing node can discover the individual file objects referenced by the fileset object. In some embodiments, the cluster file hierarchy manager node can also communicate the file objects or data of the file objects (i.e., file numbers and pointers) to the node taking over management of the fileset.

The fileset object of the cluster file hierarchy is then marked to indicate bequeathal of management of the fileset to a different node (409). For instance, a flag can be set in the fileset object. Embodiments can mark the fileset object by setting the allocation to a node value or special value with the exception of one pointer to a node meta-fileset object. Embodiments can also define fileset object to include an allocation map and a field to point to a node meta-fileset object. If node meta-fileset object pointer is not a null value, then the fileset object can be considered marked as bequeathed.

The fileset object is modified to reference or point to the node meta-fileset object inserted into the cluster file hierarchy (411). For instance, the fileset object can be set to indicate an offset the node meta-fileset object is located.

Figure 5:
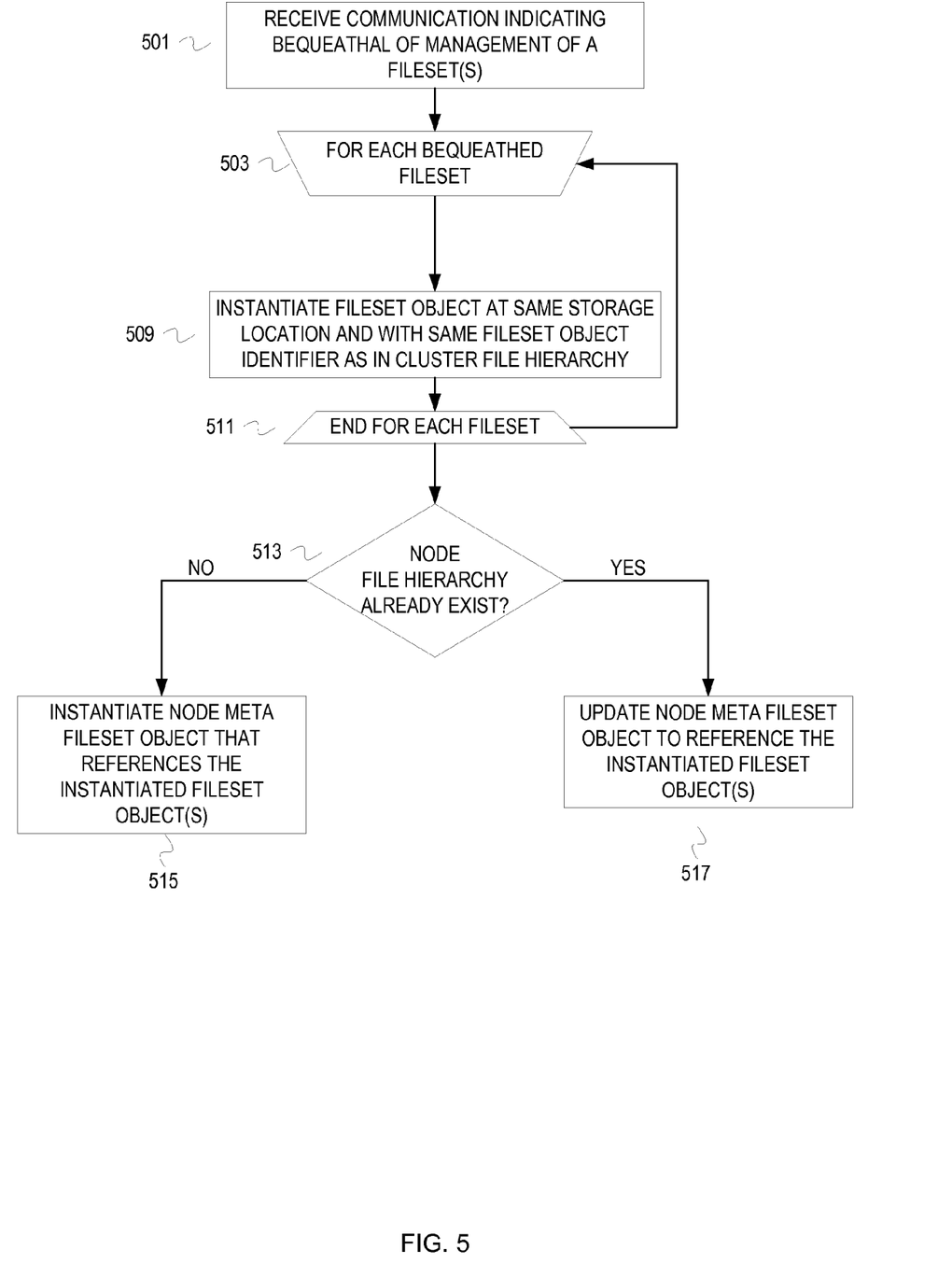
FIG. 5 depicts a flowchart of example operations for creating or updating a node file hierarchy when a node is bequeathed management of a file set.

FIG. 5 depicts a flowchart of example operations for creating or updating a node file hierarchy when a node is bequeathed management of a file set. A node receives a communication indicating bequeathal of management of a fileset(s) (501). For instance, the node receives a message identifying one or more filesets and a flag or command corresponding to bequeathal of management. The message can indicate data of the fileset objects (e.g., fileset object identifier, pointers, etc.) or location of the fileset objects.

For each bequeathed fileset loop of operations begins (503).

A fileset object is instantiated at a same storage location and with the same fileset object identifier as in the cluster file hierarchy is instantiated (509). The function or method that instantiated fileset objects can be called or invoked with a flag or parameter that directs the method or function to use a same identifier and a same location. In some embodiments, a different method or function can be invoked. Embodiments can update the fileset objects at the location communicated by the cluster file hierarchy manager node instead of recreating the file object at the same location. For instance, the fileset object could just be updated to reflect the new managing node, and possibly an alternate node.

The loop of operations ends after the last fileset object of the bequeathed fileset object(s) is created (511).

The node then determines if a node file hierarchy already exists (513). If the node already manages other filesets, then the fileset objects are added to the node file hierarchy (515). Otherwise, a root for the node file hierarchy is created (517).

If the node file hierarchy already exists, then the root (i.e., the node meta fileset object) is set to reference the instantiated fileset object(s) (517).

If the node file hierarchy does not already exist, then a node meta fileset object is instantiated (515). The instantiated node meta fileset object is set to reference the instantiated fileset object(s).

Although FIGS. 4 and 5 describe the node assuming management responsibility as instantiating the root of the node file hierarchy (i.e., the node meta fileset object), embodiments are not so limited. For example, the node meta fileset object created by the cluster file hierarchy manager node may be the root for the node file hierarchy. The cluster file hierarchy manager node can communicate the location of the node meta fileset object to the other node that will manage the bequeathed fileset, along with information of the corresponding fileset object. In this case, the fileset object does not necessarily point to the node meta fileset object. The marking on the fileset object informs the cluster file hierarchy node manager to do no more than determine the managing node instead of resolving the allocation map of the fileset object. The node file hierarchy manager will update the node metafile object to reference the fileset object. If the fileset object does not reference the node meta fileset object, then the cluster file hierarchy manager node can track node management of portions of the cluster file hierarchy with a separate structure, or the marking on the fileset object can be the identity of the managing node.

Figure 6:
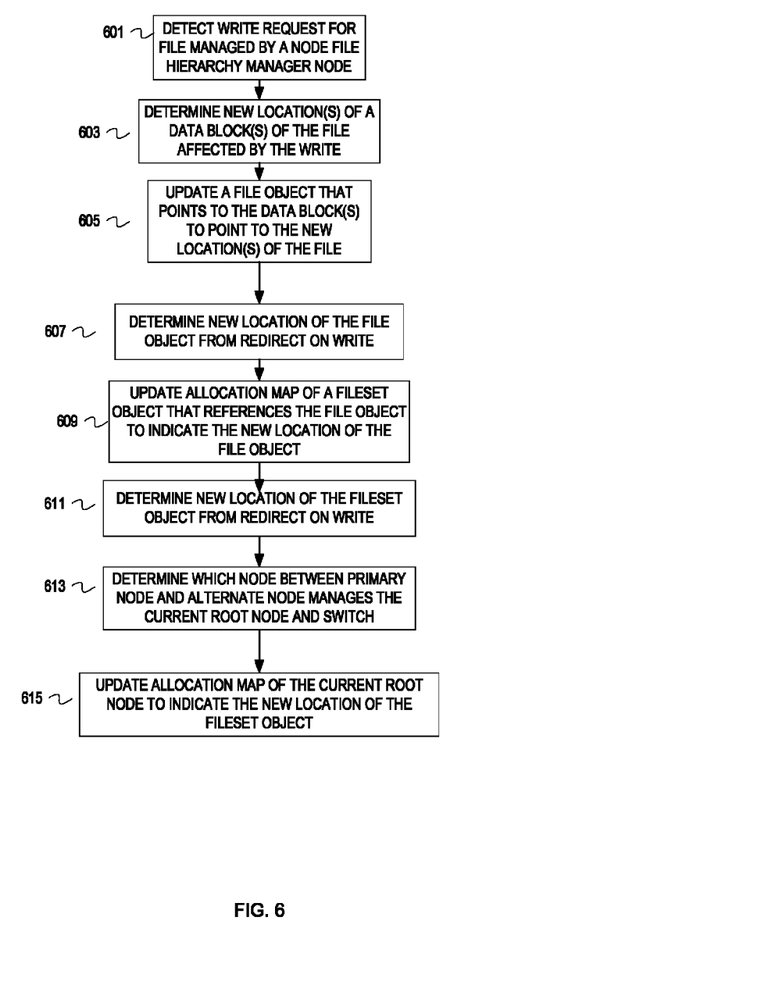
FIG. 6 depicts a flowchart of example operations for updating the objects of a node file hierarchy response to a write operation.

As stated earlier, a backup or alternate can be selected for node file hierarchy manager nodes. FIG. 6 depicts a flowchart of example operations for updating the objects of a node file hierarchy responsive to a write operation. A write request for a file managed by a node file hierarchy manager node is detected (601). For instance, a client submits a request or command to modify a data block of a file.

A new location(s) of the data block(s) of the file affected by the write is determined from the redirect on write (603). For instance, the node either allocates the new location or determines the new location from the node that performs the redirect on write (e.g., the client, the node itself, or another node).

The node then updates a file object that points to the data block(s) to point to the new location(s) of the data block(s) (605). For instance, a pointer in an inode for the file is updated to point to the new location of the data block impacted by the write. In some embodiments, the update to the inode will cause the entire inode to be written to a new location.

The new location of the file object is determined from the redirect on write (607).

The allocation map of the fileset object that references the file object is updated to point to the new location of the file object (609). This update to the allocation map results in the fileset object being written to a new location.

The new location of the fileset object from the redirect on write is determined (611).

The file system determines which node between the primary node (node file hierarchy manager node) and the alternate node manages the current root node for the node file hierarchy (613). The indication is then switched. For instance, the primary node and the alternate node each manage a node meta fileset object. A particular bit can be set to in the node meta fileset objects to indicate which node is the current root node.

The allocation map of the current root node is updated to point to the new location of the fileset object (615).

The depicted flowcharts are provided to aid in understanding the inventive subject matter and should not be used to limit the scope of the claims. Embodiments can perform additional operations, fewer operations, operations in a different order, operations in parallel, etc. For instance, the operation depicted by 403 of FIG. 4 may not be performed. As another example, the operations of FIG. 5 can be modified to first instantiate a root for the node file hierarchy and update the root to point to each fileset object.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
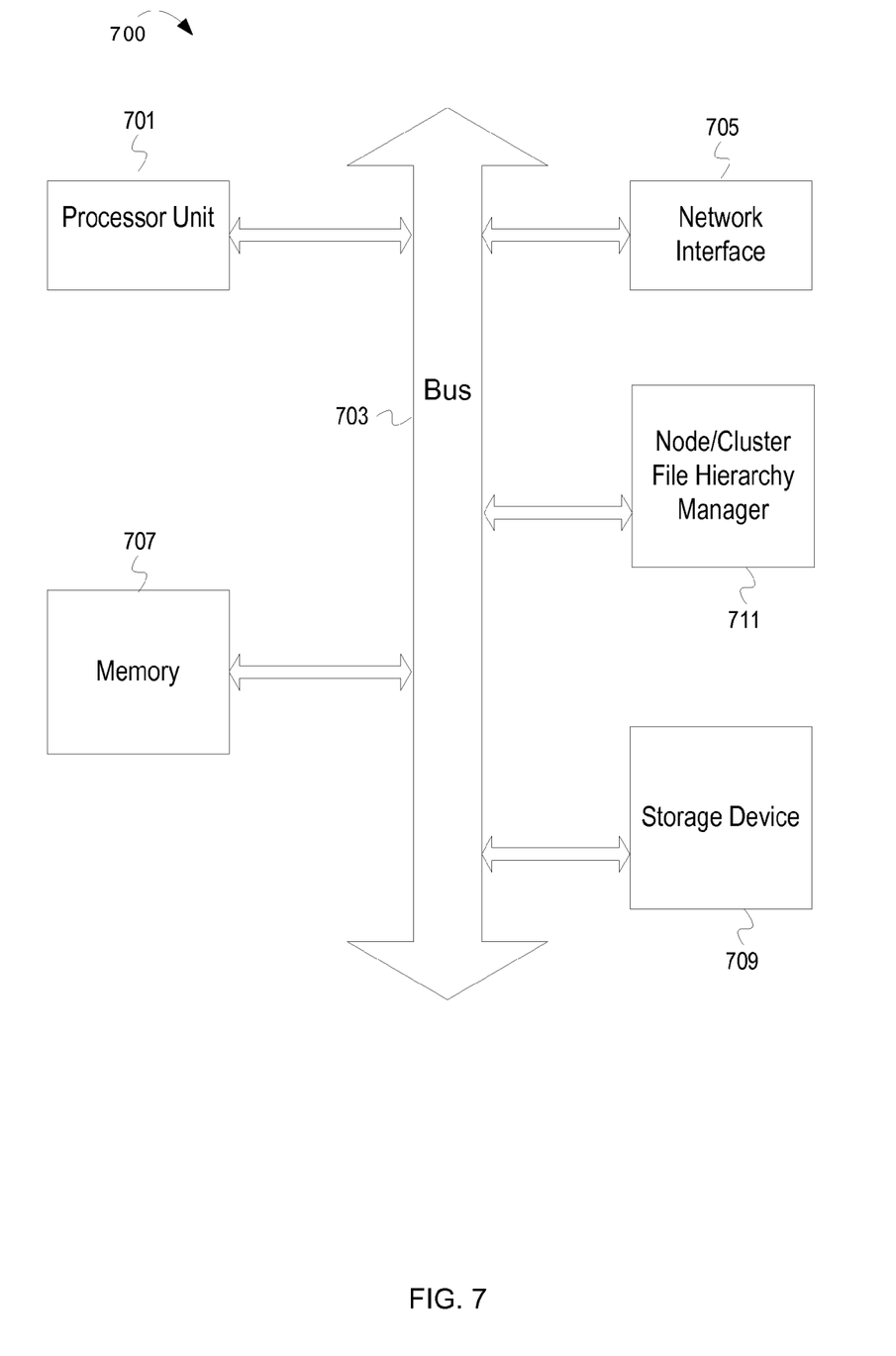
FIG. 7 depicts an example computer system.

FIG. 7 depicts an example computer system. A computer system 700 includes a processor unit 701 (possibly including multiple processors, multiple cores, multiple nodes, and/or implementing multi-threading, etc.). The computer system includes memory 707. The volatile machine readable medium 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, Infini-Band®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system 700 also includes a node/cluster file hierarchy manager 711 that can perform updates to a node file hierarchy or a cluster file hierarchy depending on whether the hosting computer system 700 is a cluster file hierarchy manager node or a node file hierarchy manager node. It may be that the memory 707 embodies the clustered file system 711. Realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for distributed management of a cluster file hierarchy as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for distributed management of a file hierarchy of a clustered file system comprising:

accessing a cluster file hierarchy to determine location of a file in response to a request to write to a file, wherein a first node maintains the cluster file hierarchy, wherein the cluster file hierarchy comprises a cluster meta fileset object that references a plurality of fileset objects, wherein each of the plurality of fileset objects represents a logical grouping of files and the cluster meta fileset object represents a logical grouping of filesets corresponding to the plurality of fileset objects;

determining that management of a fileset object, which represents a fileset that includes the file, has been delegated to a second node based, at least in part, on said accessing the cluster file hierarchy;

accessing a node file hierarchy maintained by the second node, wherein said cluster file hierarchy represents filesets of the clustered file system and the node hierarchy represents a subset of one or more of the filesets;

determining location of the file based, at least in part, on said accessing the node file hierarchy wherein said determining location of the file based, at least in part, on said accessing the node file hierarchy comprises, accessing a node meta fileset object, wherein the node meta fileset object points to a set of one or more fileset objects that represent the subset of one or more filesets managed by the second node; dereferencing a pointer in the node meta fileset object to the fileset object;

dereferencing a pointer in the fileset object to a file object that represents the file; and dereferencing a set of one or more pointers of the file object to a set of one or more data blocks of the file, wherein the set of one or more data blocks are indicated by the request.

2. The method of claim 1, wherein said accessing the cluster file hierarchy to determine location of the file comprises accessing the meta fileset object to determine location of the fileset object.

3. The method of claim 2, wherein said determining that management of the fileset object has been delegated to the second node comprises determining that the fileset object is marked.

4. The method of claim 3 further comprising delegating management of the fileset object from the first node to the second node.

5. The method of claim 2, wherein said delegating management of the fileset object from the first node to the second node comprises marking the fileset object to indicate the second node.

6. The method of claim 1 further comprising: updating the fileset object to point to a new set of one or more locations of the set of one or more data blocks;

selecting between the second node and a third node that has been designated as an alternative to the second node; updating a root of the node file hierarchy at the selected one of the second and the third node; and indicating the unselected one of the second and the third node to be selected at a next update of the node file hierarchy.

7. A computer program product for distributed management of a file hierarchy of a clustered file system, the computer program product comprising:

a computer readable storage medium having computer usable program code embodied therewith, the computer usable program code comprising a computer usable program code configured to:

manage a cluster file hierarchy for a clustered file system, wherein the cluster file hierarchy comprises of a cluster meta fileset object that references a plurality logical of fileset, wherein each of the plurality of fileset objects represents a computer readable representation of logical grouping of files, and the cluster meta fileset object represents a logical grouping of filesets corresponding to the plurality of fileset objects;

determine a condition for delegating management of a fileset of the clustered file system to a different node;

communicate to the different node the fileset and that the different node manage the fileset;

mark a first of the computer readable representations of filesets to reflect management of the fileset by the different node;

access the cluster file hierarchy to determine location of a file in response to a request to write to the file;

determine that the fileset delegated to the different node for management represents a logical grouping of files that includes the file;

determine identity of the different node; and communicate the identity of the different node to a requestor that sent the request to write to the file.

8. The computer program product of claim 7, wherein the computer usable program code is further configured to select an alternate node to manage the fileset in case the different node fails.

9. The computer program product of claim 7, wherein the computer usable program code being configured to access the cluster file hierarchy to determine location of the file in response to the request to write to the file comprises the computer usable program code being configured to access the computer readable representation of the logical grouping of filesets to determine location of the fileset object.

10. The computer program product of claim 7, wherein the computer usable program code being configured to determine that the fileset delegated to the different node for management represents the logical grouping of files that includes the file comprises the computer usable program code being configured to determine that the computer readable representation of the fileset has been marked.

11. An apparatus comprising:

a processor;

a network interface; and a cluster file hierarchy manager operable to:

manage a cluster file hierarchy for a clustered file system, wherein the cluster file hierarchy comprises of a cluster meta fileset object that references a plurality logical of fileset, wherein each of the plurality of fileset objects represents a logical grouping of files and the cluster meta fileset object represents a logical grouping of filesets corresponding to the plurality of fileset objects;

determine a condition for delegating management of a fileset of the clustered file system to a different node;

communicate to the different node the fileset and that the different node manage the fileset;

mark a first of the computer readable representations of filesets to reflect management of the fileset by the different node;

access the cluster file hierarchy to determine location of a file in response to a request to write to the file;

determine that the fileset delegated to the different node for management represents a logical grouping of files that includes the file; and determine identity of the different node; and communicate the identity of the different node to a requestor that sent the request to write to the file.

12. The apparatus of claim 11, wherein the cluster file hierarchy manager is operable to select an alternate node to manage the fileset in case the different node fails.

13. The apparatus of claim 11, wherein the cluster file hierarchy manager being operable to access the cluster file hierarchy to determine location of the file in response to the request to write to the file comprises the cluster file hierarchy manager being operable to access the computer readable representation of the logical grouping of filesets to determine location of the fileset object.

14. The apparatus of claim 11, wherein the cluster file hierarchy manager being operable to determine that the fileset delegated to the different node for management represents the logical grouping of files that includes the file comprises the cluster file hierarchy manager being operable to determine that the computer readable representation of the fileset has been marked.

15. The apparatus of claim 11 further comprising a computer readable storage medium that embodies the cluster file hierarchy manager.

* * * * *